Oct. 7, 1969    R. E. TRUESDELL ET AL    3,471,355

PANEL MOLDING STRUCTURE

Filed March 1, 1966

INVENTORS
ROBERT E. TRUESDELL
& WILLIAM H. NIENSTEDT

BY

ATTORNEY

United States Patent Office 3,471,355
Patented Oct. 7, 1969

3,471,355
PANEL MOLDING STRUCTURE
Robert E. Truesdell, Rochester, and William H. Nienstedt, Detroit, Mich., assignors to Allied Chemical Corporation, New York, N.Y., a corporation of New York
Filed Mar. 1, 1966, Ser. No. 530,931
Int. Cl. B32b 3/02, 7/02
U.S. Cl. 161—40                                    12 Claims

ABSTRACT OF THE DISCLOSURE

This invention relates to a panel molding structure and more particularly to a molding for dielectric heat sealing to a panel board in which the molding is provided with a unitary duplex body, one portion of which comprises a dielectrically sealable relatively thin layer of a flexible and soft plastic material and another portion comprises a plastic supporting body or carrier of a hard and flexible material, the two portions being dual extruded into a unitary fused member. Attached to the supporting body is an outer covering layer which is, in one embodiment, a metal channel strip and, in another, a polyester film.

---

The invention in one form involves extruding a relatively thin layer of a dielectrically heat sealable plastic material, such as an elastomeric vinyl upon a portion of a supporting body or carrier such as a hard, relatively rigid, filled vinyl, or an acetate, or a styrene, or a combination of acetate and styrene plastic material. In another form of the invention, the supporting body or carrier can be a relatively inexpensive soft vinyl containing a low cost filler material that can be shaped by a dielectric heat sealing die and take a form complementary with the form of such die. The invention involves the dual extrusion of both the carrier and the dielectrically heat sealable plastic layer to form a fused unitary member. The heat sealable layer is preferably made of relatively pure vinyl or vinyl with a color filler, its durometer being relatively low, about the order of 65 to 75.

In the combination for which the duplex unitary member is particularly designed and in which it is conjoined by dielectric heat sealing, the mating part or component of the duplex member is a heat sealable plastic layer which is fused to another heat sealable compatible plastic layer on a second member by dielectrical heating. This combination is readily employed in securing moldings to interior panels in automobiles. The present invention avoids the myriad disadvantages and shortcomings encountered when mechanical fasteners are used to secure moldings to interior panels in automobiles, and also constitutes an improvement upon vinyl or plastic clad molding strips heretofore known and used in combination with interior automobile panels.

The present invention provides a composite duplex structure which includes a plastic support member that may be composed, for example, of a styrene, a vinyl, a butyrate, an acrylic, a polyethylene or equivalent plastic material. The plastic employed for the carrier or support member may be used in substantially a pure condition or having an admixed filler, such, for example, as inorganic pigments, metallic oxides, mineral powders, diatomaceous earths, synthetic fibers, or powdered metals. The composite duplex structure also includes a first dielectrically heat sealable plastic layer which is disposed on a portion of the plastic support member. The plastic support member and the first heat sealable plastic layer are formed or fused into a unitary duplex fused body by a process of dual extrusion. This extruded duplex body is joined to a second body or member having a second dielectrically heat sealable layer. To accomplish this, the first and second heat sealable layers are disposed adjacent one another and are fused to each other by dielectrically heat sealing to conjoin the extruded duplex body and the second body.

In one embodiment of the present invention adapted for use as a panel molding, the structure includes a metal channel or cover strip within which the extruded duplex body is disposed. The first heat sealable plastic layer is exposed and not covered by the metal channel strip. The metal channel strip and the extruded duplex body form an elongated panel molding strip. The first heat sealable plastic layer of the duplex body is dielectrically fused to the second heat sealable plastic layer of the second body to conjoin the panel molding strip to the second body. A relatively rigid backing member, such as fiber board, forms part of the second body in the embodiment now being described. A resilient cushioning layer also forms a part of the second body and is disposed adjacent the relatively rigid backing member. The second heat sealable plastic layer is disposed on a surface of the resilient cushioning layer remote from the backing member.

One object of the invention is to provide a composite molding structure which may be secured to other members by dielectric heating and without the use of mechanical fasteners. Another object is to provide a novel panel molding strip including a dually extruded duplex body, optionally having a metal covering or a polyester covering, and which may be fusibly secured to a panel, or other body, having a plastic fusible layer thereon. A further object is to provide a panel molding structure including a composite extruded body which may be formed of one or two plastics, with or without fillers, which extruded body is bonded by dielectric heat sealing to a plastic layer of another body, such plastic layer being formed of a plastic compatible with an adhering fusible plastic layer of the extruded body.

Other objects, structural features and advantages of the invention will become apparent from the following description taken in conjunction with the accompanying drawings in which.

Figure 1:
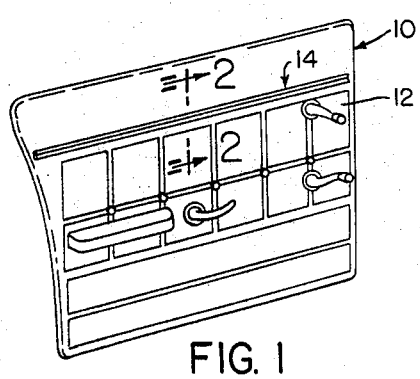
FIGURE 1 is a perspective view of an automobile interior door panel having a molding strip conjoined thereto in accordance with the present invention.
Figure 2:
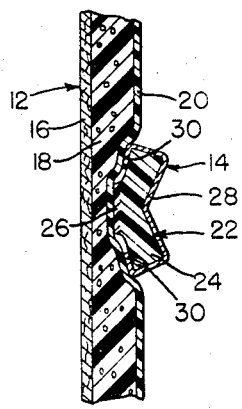
FIGURE 2 is a partial vertical sectional view taken substantially along the line 2—2 of FIGURE 1.
Figure 3:
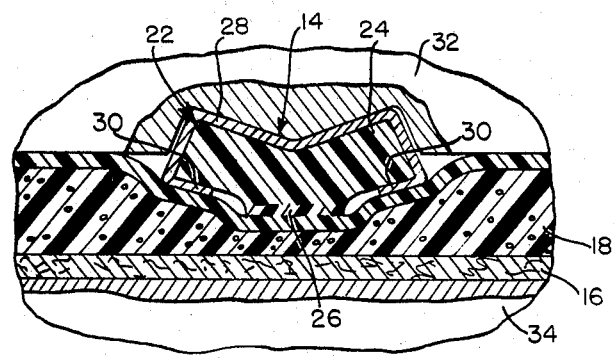
FIGURE 3 is a slightly enlarged view similar to that shown in FIGURE 2 and including fragmentary portions of a pair of dielectric heat sealing dies.

With reference particularly to the embodiment illustrated in FIGURES 1 through 3 inclusive, the panel molding strip structure 10 comprises an interior panel 12 and a molding strip 14 secured to the panel.

The panel 12 comprises, in the form shown, a backing member 16 which may be more or less flexible in nature, although a relatively rigid member such as fiber board is preferred, a resilient cushioning layer 18 of a vinyl impregnated urethane, a rubberized or plastic coated fibrous material, or equivalent, and a relatively thin heat sealable plastic layer 20 such as a vinyl layer.

The molding strip 14, in the embodiment illustrated in

FIGURES 1 through 3, comprises an elongated unitary duplex body 22 having a plastic carrier or support portion 24 of relatively firm and rigid, yet flexible, material such as a pigmented vinyl, characterized by a durometer of 100 or more, and a relatively thin dielectrically heat sealable plastic layer 26, of a relatively softer vinyl layer, characterized by a durometer of 65 to 75. The supporting portion 24 and the heat sealable layer 26 are formed into the unitary duplex body 22 by a dual extrusion process. A metal channel or cover 28 is placed upon the extruded body 22 in such manner that the heat sealable plastic layer is left exposed for contact with the plastic layer 20 of the panel 12. The metal channel 28 is provided with inturned flanges 30, 30 extending longitudinally of the strip 14 to aid securement to the duplex body 22.

In FIGURE 3 is illustrated how the metal covered panel molding strip 14 is dielectrically heat sealed to the panel 12. The die electrodes 32, 34 of the dielectric heating equipment (not shown) press the molding strip firmly into the panel so that the strip layer 26 makes close intimate contact with the layer 20 of the panel, and while so pressed together, pass a high voltage current through the materials to heat seal and fuse the layers together under pressure, whereby the strip 14 is bonded to the panel 12. The inturned flanges 30 of the metal channel 28 are disposed between the support portion 24 and the heat sealable plastic layer 20 of the panel 12 so that it is retained upon the duplex extruded body 22.

Figure 4:
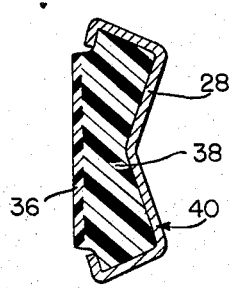
FIGURE 4 is a transverse cross-sectional view of a molding strip of a third embodiment having a wider first heat sealable plastic layer.
Figure 5:
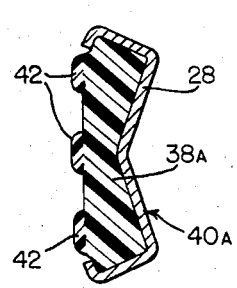
FIGURE 5 is a view similar to FIGURE 4 of a fourth embodiment having a series of parallel heat sealable plastic strips disposed on the carrier or supporting portion of the duplex body.

In FIGURE 4, a wider heat sealable plastic layer 36 is extruded upon and coincident with the extrusion of the support portion 38 to form a slightly modified duplex body 40, to which the metal channel 28 can be secured. Alternatively, the single plastic layer 36 can be divided into a number of longitudinally extending ribbon strips 42, 42, 42, as shown in FIGURE 5, which are dual extruded upon and with the support portion 38A of the duplex body 40A.

Figure 6:
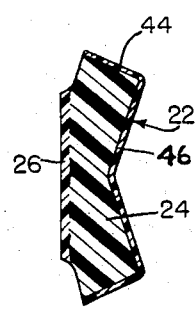
FIGURE 6 is a view similar to FIGURE 4 of a fifth embodiment having a polyester coating on the duplex extruded body.

In FIGURE 6 is illustrated a molding strip duplex body 22 to which is secured by heat sealing a polyester coating 44, such as Mylar, in place of the metal channel or cover strip. A metallized vacuum deposited coating can be applied to the exterior surface 46 of the duplex body 22, except in the area of the plastic layer 26, as an alternative coating.

The three plastic components, viz., the heat sealable plastic layer 20, the support member 24, and the heat sealable plastic layer 26 or 36, or the strips 42, may be made of the same or different types of plastic material, as desired, so long as these materials are compatibly heat fusible. It is preferred to use a relatively hard plastic, such as styrene, or a plastic with a strenghtening filler for the support portion 24 of the duplex body 22. The three plastic components may be selected from vinyls, styrenes, acrylics, butyrates, polyethylenes, any of the foregoing with fillers, copolymers of any of the foregoing, and other plastic materials. It has been found satisfactory to employ a soft vinyl plastic for the heat sealable layers, but one type of plastic may be used for one heat sealable layer and a different but fusibly compatible type plastic may be used for the other mating heat sealable layer.

It is to be understood that, although the invention has been described with specific reference to particular embodiments thereof, it is not so limited since changes and alterations therein may be made which are within the full intended scope of this invention.

We claim:
1. A composite structure comprising in combination:
 (1) a supporting panel having a surface layer of a dielectrically heat-sealable plastic material,
 (2) a molding structure dielectrically heat-sealed to said panel surface layer and comprising
  (a) an outer covering layer having a cross-sectional configuration generally in the form of a channel having an intermediate portion and two edge portions secured to said intermediate portion on opposite sides thereof, said edge portions extending away from said intermediate portion in the same general direction and terminating closely adjacent said surface layer whereby an interior space is formed between said surface layer and said outer covering layer,
  (b) a laminated duplex body secured to and supporting said outer covering layer, said laminated duplex body comprising
   (aa) a plastic support portion formed of a relatively hard and rigid plastic material secured to said outer covering layer and substantially filling a major portion of said interior space, and
   (bb) a relatively thin softer layer of dielectrically heat-sealable plastic material fused to said plastic support portion between said edge portions of said outer covering layer and substantially filling the remaining portion of said interior space, said thin softer layer being located inwardly from said edge portions of said covering layer and being sufficiently thin and limited in volume to substantially prevent outflow thereof onto the exposed portion of said panel surface layer adjacent said molding structure due to the sealing operation, said thin softer layer being dielectrically heat-sealed directly to said panel surface layer.

2. The structure defined in claim 1, wherein said plastic support portion is characterized by a hardness of about 100 or more on a durometer scale and said thin softer layer is substantially softer and characterized by a hardness of from about 65 to about 75 on a durometer scale.

3. The structure defined in claim 1, wherein said outer covering layer comprises
 a metallic body secured to and substantially closely overlying and supported by said plastic support portion.

4. The structure defined in claim 1, wherein said outer covering layer comprises
 a polyester film coating secured to and substantially closely overlying and supported by said plastic support portion.

5. The structure defined in claim 1, wherein said outer covering layer comprises
 a vacuum metallized deposition coating secured to said plastic support material.

6. The structure defined in claim 1, wherein said thin softer layer of plastic material comprises a plurality of spaced apart strips.

7. A composite molding structure adapted to be secured to a dielectrically heat-sealable plastic surface layer of a supporting panel by the dielectric heat-sealing process and comprising in combination:
 (1) an outer covering layer having a cross-sectional configuration generally in the form of a channel having an intermediate portion and two edge portions secured to said intermediate portion on opposite sides thereof, said edge portions extending away from said intermediate portion in the same general direction and terminating closely adjacent said surface layer when said molding structure is secured thereto, whereby an interior space will be formed between said surface layer and said outer covering layer,
 (2) a laminated duplex body secured to and supporting said outer covering layer, said laminated duplex body comprising
  (aa) a plastic support portion formed of a relatively hard and rigid plastic material secured to said outer covering layer and adapted to substantially fill a major portion of said interior space, and (bb) a relatively thin softer layer of dielectrically heat-sealable plastic material fused to said plastic support portion between said edge portions of said outer covering layer and adapted to substantially fill the remaining portion of said interior space, said thin softer layer being located inwardly from said edge portions of said covering layer and being sufficiently thin and limited in volume to substantially prevent outflow thereof onto the exposed portion of said panel surface layer adjacent said molding structure due to the sealing operation, said thin softer layer adapted to be dielectrically heat-sealed directly to said panel surface layer.

8. The structure defined in claim 7, wherein said plastic support portion is characterized by a hardness of about 100 or more on a durometer scale and said thin softer layer is substantially softer and characterized by a hardness of from about 65 to about 75 on a durometer scale.

9. The structure defined in claim 7, wherein said outer covering layer comprises
a metallic body secured to and substantially closely overlying and supported by said plastic support portion.

10. The structure defined in claim 7, wherein said outer covering layer comprises
a polyester film coating secured to and substantially closely overlying and supported by said plastic support portion.

11. The structure defined in claim 7, wherein said outer covering layer comprises
a vacuum metallized deposition coating secured to said plastic support portion.

12. The structure defined in claim 7, wherein said thin softer layer of plastic material comprises a plurality of spaced apart strips.

References Cited
UNITED STATES PATENTS

| | | | |
|---|---|---|---|
| 2,684,313 | 7/1954 | Lyijynen | 161—40 |
| 3,419,458 | 12/1968 | Brooks et al. | 161—123 X |
| 3,013,919 | 12/1961 | Bialy | 161—103 |
| 3,046,179 | 7/1962 | Stallard | 156—273 X |
| 3,075,862 | 1/1963 | Hoyer | 156—273 X |
| 3,086,216 | 4/1963 | Brooks et al. | 161—119 |
| 3,107,190 | 10/1963 | Kevelin | 156—219 |

ROBERT F. BURNETT, Primary Examiner

P. THOMAS, Assistant Examiner

U.S. Cl. X.R.

156—273, 275; 161—106, 119, 166